No. 692,389. Patented Feb. 4, 1902.
G. M. VICKERS, Jr.
TRUCK.
(Application filed Nov. 2, 1901.)
(No Model.)
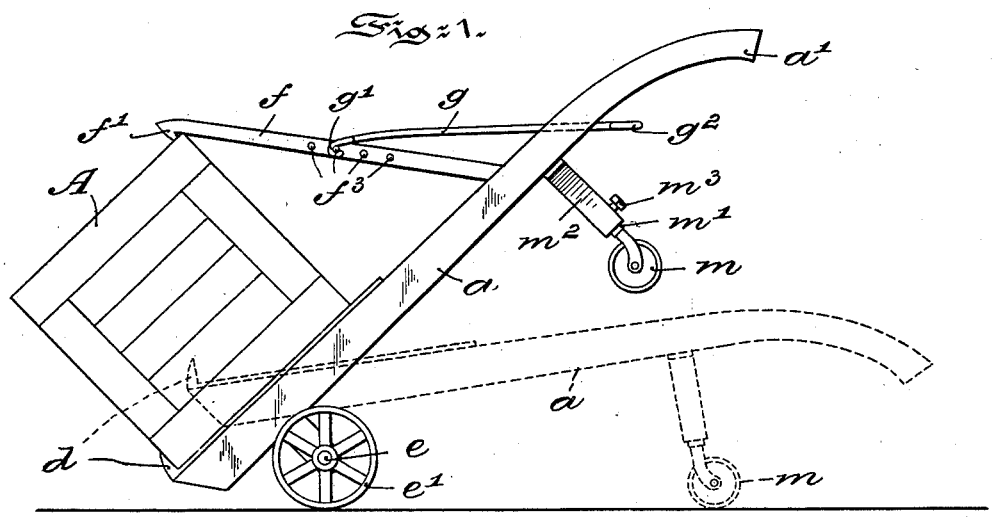
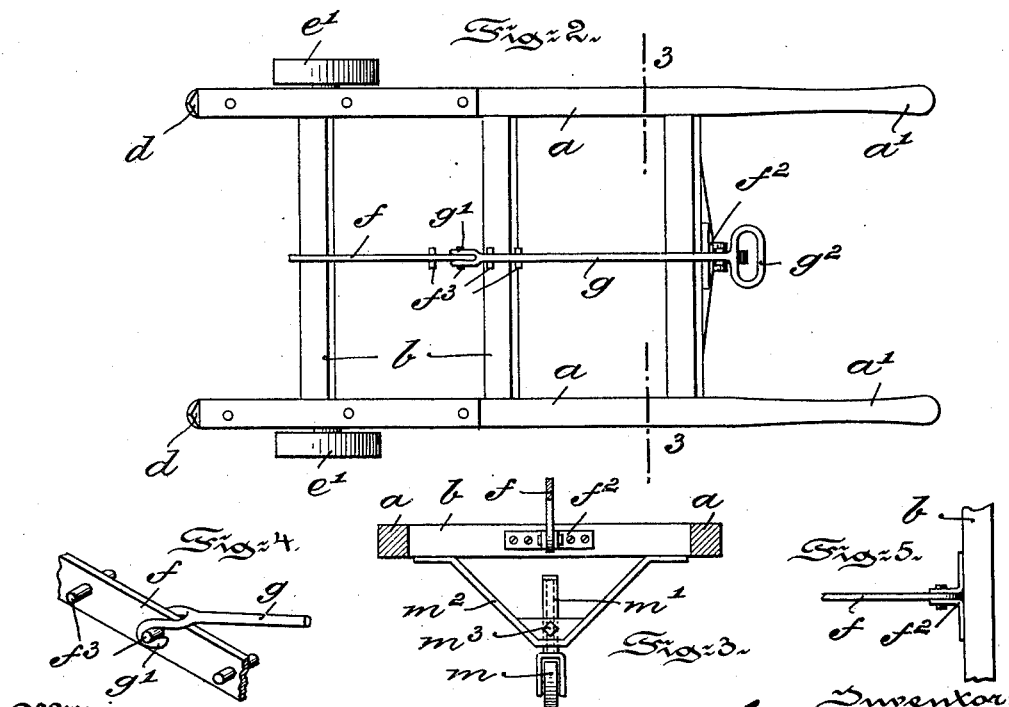
Witnesses
Wilhelm Vogt
Thomas M. Smith
Inventor
George M. Vickers Jr.
By J. Walter Douglas
Attorney

UNITED STATES PATENT OFFICE.

GEORGE M. VICKERS, JR., OF PHILADELPHIA, PENNSYLVANIA.

TRUCK.

SPECIFICATION forming part of Letters Patent No. 692,389, dated February 4, 1902.

Application filed November 2, 1901. Serial No. 80,866. (No model.)

*To all whom it may concern:*

Be it known that I, GEORGE M. VICKERS, Jr., a citizen of the United States, residing at the city of Philadelphia, in the county of Philadelphia and State of Pennsylvania, have invented certain new and useful Improvements in Trucks, of which the following is a specification.

My invention has relation to what is known as a "hand-truck," designed to receive and to transport small boxes, bales, and the like; and in such connection it relates more particularly to the construction and arrangement of such a truck.

The principal objects of my invention are, first, to provide in a hand-truck an improved hook-rod or locking device pivotally connected at one end to the truck-frame intermediate of the forward and the handle ends and provided with an operating bar or rod the forward end of which detachably and pivotally engages the hook-rod intermediate of the two ends of the hook-rod and the rear end of said operating-bar having an enlargement or handle, so that it may be manipulated manually, and, second, to provide in such a truck an auxiliary wheel or caster located between the handle and discharge ends of the truck, said wheel or caster being swiveled in a downwardly-projecting bracket extending below one of the cross-braces of the frame of the truck and adjustable vertically in said bracket.

The nature and scope of my invention will be more fully understood from the following description, taken in connection with the accompanying drawings, forming part hereof, in which—

Figure 1 is a side elevational view of a truck embodying main features of my invention, the truck being shown in full lines as tilted and in dotted lines in a horizontal position. Fig. 2 is a top or plan view of the truck. Fig. 3 is a cross-sectional view taken on the line 3 3 of Fig. 2, and Figs. 4 and 5 are detail views illustrating the construction and arrangement of the hook-rod.

Referring to the drawings, the frame of the truck comprises the side pieces $a$, united by cross-braces $b$ and carrying the prongs or spurs $d$ at the discharge ends of the truck, so that they may readily engage an article, packet, or box and assist in elevating onto and holding the same upon the truck. The side pieces $a$ are continued back into handles $a'$, and the frame of the truck is supported in front by the usual axle $e$ and wheels $e'$.

In my present invention there is provided a hook-rod $f$, designed to hold the box or package A down upon the truck-frame when the truck is tilted. As shown in the drawings, one end of this hook-rod $f$ is provided with a tooth $f'$, designed to sink into the box or package A, and to thus, in conjunction with the prongs or spurs $d$, lock the package to the truck. The other end of the hook-rod $f$ is pivoted in a bracket $f^2$, secured to, preferably, the last or rear cross-brace $b$, as clearly illustrated in Fig. 3. This pivotal point is situated, preferably, midway between the side pieces $a$. The hook-rod $f$ is also provided with a series of pins $f^3$, traversing the rod $f$ and projecting from either side of the same. A bar $g$, having a forked and hooked end $g'$, is designed to engage one or the other of the pins $f^3$ in series, spanning the hook-rod $f$ and engaging the pin on both sides of said hook-rod $f$, as illustrated in Fig. 4. This operating-bar $g$ is formed at its free end into a handle $g^2$, by means of which the bar $g$ may be drawn backward at the proper time to disengage the toothed end of the hook-rod $f$ from the box or package A.

Another feature of the present invention consists in providing the truck with a rear caster-wheel $m$. This wheel $m$ has a shank or stem $m'$, which enters a bracket $m^2$, projecting below the rear cross-brace $b$, and is swiveled in said bracket. A set-screw $m^3$ locks the stem $m'$ in the bracket and prevents the withdrawal of the caster $m$, while providing a means for adjusting the caster $m$ vertically with respect to the cross-brace $b$ and bracket $m^2$.

When the truck is lowered to the position indicated in dotted lines in Fig. 4, the frame $a$ is supported upon three wheels and can be pulled or hauled around like a wagon-truck. The caster $m$ never acts as a fulcrum, the leverage being always exerted upon the axle $e$ of the wheels $e'$.

Having thus described the nature and objects of my invention, what I claim as new, and desire to secure by Letters Patent, is—

In a hand-truck, the combination of the side pieces each having at the delivery end of the truck an upwardly-projecting prong or spur adapted to slide under the package when the handle end of the truck is elevated, to penetrate the package when said handle end is lowered, with a hooked rod pivotally connected at its rear end to the truck-frame and having a prong at its free end adapted to penetrate the package to lock the same, in conjunction with the prongs of the side pieces, to the truck-frame, and an operating-bar disconnected from the truck-frame and adapted to detachably and adjustably engage the hooked rod intermediate of the ends of said rod, substantially as and for the purposes described.

In testimony whereof I have hereunto set my signature in the presence of two subscribing witnesses.

GEO. M. VICKERS, JR.

Witnesses:
J. WALTER DOUGLASS,
THOMAS M. SMITH.